United States Patent [19]

Sashida

[11] Patent Number: 5,422,518
[45] Date of Patent: Jun. 6, 1995

[54] ELECTRIC POWER SUPPLY SYSTEM USING MULTIPLE POWER SOURCES

[75] Inventor: Nobuo Sashida, Kobe, Japan

[73] Assignee: Mitsubishi Denki Kabushiki Kaisha, Tokyo, Japan

[21] Appl. No.: 64,581

[22] Filed: May 21, 1993

[30] Foreign Application Priority Data

May 22, 1992 [JP] Japan .................. 4-130912

[51] Int. Cl.$^6$ .............................................. H02J 3/06
[52] U.S. Cl. ......................................... 307/75; 307/87
[58] Field of Search .................. 307/45, 66, 87, 86, 307/43, 44, 72, 75

[56] References Cited

U.S. PATENT DOCUMENTS

| | | | |
|---|---|---|---|
| 3,932,764 | 1/1976 | Corey | 307/85 |
| 4,937,462 | 6/1990 | Recker et al. | 307/19 |
| 5,172,009 | 12/1992 | Mohan | 307/66 X |
| 5,221,862 | 6/1993 | Fiorina et al. | 307/66 |

FOREIGN PATENT DOCUMENTS

| | | |
|---|---|---|
| 2632130 | 5/1989 | France . |
| 51-24690 | 7/1976 | Japan . |
| 58-50089 | 11/1983 | Japan . |
| 2175155 | 11/1986 | United Kingdom . |
| 2185835 | 7/1987 | United Kingdom . |

*Primary Examiner*—A. D. Pellinen
*Assistant Examiner*—Y. Jessica Han
*Attorney, Agent, or Firm*—Leydig, Voit & Mayer

[57] ABSTRACT

A power supply system of a high reliability and stability capable of suppressing a cross current flow by establishing rapidly synchronism between a power converter and an AC power source in a parallel operation for changing over the power supply sources. The power supply system comprises a current sensor for detecting an AC current supplied from a power converter, a comparator for making decision as to whether the AC current exceeds a predetermined value, and a regulation input means for fetching an active component of the AC power supplied from the power converter in response to an output signal of the comparator, wherein when the AC current exceeds a predetermined value, an output frequency of the power converter is speedily regulated so as to coincide with an output frequency of the AC power source in accordance with a drooping characteristic of the active component of the AC power, while in an isolated operation of the power converter, the output frequency is set at a predetermined value.

11 Claims, 10 Drawing Sheets

ELECTRIC POWER SUPPLY SYSTEM USING MULTIPLE POWER SOURCES

BACKGROUND OF THE INVENTION

1. Field of the Invention

The present invention relates generally to an electric power supply system in which a power converter such as an inverter or the like and other AC power as an electric generator can be operated in parallel by maintaining a current-balanced state. More particularly, the invention is concerned with an electric power supply system in which a power converter such as an inverter and an AC power source such as a generator can be changed over with each other without involving interruption of power supply to a load by suppressing a voltage build-up due to a cross current.

2. Description of the Related Art

A method of operating in parallel a power converter such as an inverter and another AC power source such as a generator by imparting a drooping characteristic to an output frequency of the inverter is well known in the art.

The power supply system of this type is employed, for example, as a static-type power source system for an aircraft. More specifically, during an ordinary flight operation, an onboard electric generator is used as a power source for supplying electric power to a load, while after the landing, operation of the onboard generator is stopped and the power supply to the load is changed over to an inverter installed on the ground. At that time, two power sources are temporarily connected in parallel to the load, whereon these power sources are changed over without interrupting the power supply to the load.

For a better understanding of the present invention, a power supply system of this type known heretofore will be discussed in some detail. FIG. 8 is a block diagram showing schematically a structure of a hitherto known power supply system which includes a power converter connected such that it can be operated in parallel with a generator. Parenthetically, this type power supply system is disclosed, for example, in Japanese Patent Publication No. 24690/1976.

Referring to the figure, a power converter typified by an inverter 1 serves to convert a DC power $P_d$ (a product of a DC voltage $V_d$ and a DC current $I_d$) supplied from a DC power source (not shown) to an AC power $P_1$ (a product of an AC voltage $V_1$ and an AC current $I_1$). Another AC power source such as an electric generator 2 is provided in parallel to the inverter 1.

The output frequency (frequency of the AC power $P_1$) of the inverter 1 is controlled or regulated in dependence on the voltage by an inverter control circuit described hereinafter so as to be substantially equal to that of the output frequency of the AC power source 2 (i.e., the frequency of the AC power $P_2$).

The inverter 1 and the AC power source 2 which constitute a parallel-type power source are connected to an AC bus 5 via switches 3 and 4, respectively. Further, a load 6 is connected to the bus 5 so that the AC power $P_1$ or $P_2$ generated by the inverter 1 or the AC power source 2 can be supplied to the load 6. In the parallel operation, both the switches 3 and 4 are closed, and thus the inverter 1 and the AC power source 2 share the power supply to the load 6 with each other. In the ordinary or normal operation, either one of the switch 3 or switch 4 is closed, whereby either one of the inverter 1 or the AC power source 2 bears the power supply to the load 6.

An inverter control circuit for adjusting or regulating the output frequency of the inverter in accordance with an effective or active component of the AC power $P_1$ is comprised of a voltage control circuit 10 for controlling the AC voltage $V_1$ supplied from the inverter 1 so that it coincides with a reference voltage $V_{ref}$, a subtractor 11 for determining arithmetically a deviation or difference $\Delta V$ between the AC voltage $V_1$ and the reference voltage $V_{ref}$, and a voltage sensor 12 for detecting the AC voltage $V_1$, wherein the elements mentioned above constitute a feedback control circuit for equalizing the AC voltage $V_1$ outputted from the inverter 1 to the reference voltage $V_{ref}$.

The reference voltage $V_{ref}$ is generated by a reference voltage generating circuit 13 which serves for determining the output frequency of the inverter 1 on the basis of an oscillation frequency f outputted from a voltage-controlled oscillator 14.

The effective power P of the AC power $P_1$ output from the inverter 1 is detected by a power sensor 15, wherein the effective power P as detected is input to the voltage-controlled oscillator 14.

The voltage-controlled oscillator 14 exhibits a voltage-versus-frequency (P-f) relationship as represented by a solid line curve shown in FIG. 9. Incidentally, a broken line curve represents a power-versus-frequency (P-f) relationship of the AC power source 2 or generator.

The output frequency f of the voltage-controlled oscillator 14 lies at a center frequency $f_0$ when the inverter 1 is in the no-load state (i.e., when P=0). However, this output frequency f droops as the effective power P increases. By way of example, when the effective power P output from the inverter i increases to $P_1$ (>0), the oscillation frequency f droops by $\Delta f$. On the contrary, when the effective power P is negative, i.e., when the AC power $P_2$ is not consumed by the load 6 but fed back as a regenerative power, the oscillation frequency f rises.

FIG. 10 is a block diagram showing an exemplary configuration of the voltage-controlled oscillator 14 exhibiting the operation characteristics illustrated in FIG. 9.

As can be seen from this figure, the voltage-controlled oscillator 14 is comprised of oscillation circuitry 21 including a quartz oscillator which oscillates at a constant frequency F, frequency divider circuitry 22 for dividing the oscillation frequency of the oscillator circuitry 21 to thereby output, for example, an eight-bit signal 22a, an analogue-to-digital (A/D) converter 23 for converting an analogue signal output from the power sensor 15, i.e., the effective power P, into a digital signal such as, for example, a four-bit signal 23a.

The four-bit signal 23a and the eight-bit signal 22a are input to a digital multiplier 24 which serves to modulate the four less significant bits of the eight-bit signal 22a with the four-bit signal 23a to thereby regulate the constant oscillation frequency F in dependence on the effective power P. The output of the multiplier 24 is supplied to a frequency divider 25 which serves for dividing the frequency output of the multiplier 24 to thereby output a proper oscillation frequency f which corresponds to the output frequency of the inverter 1.

Next, referring to FIG. 9, description will be directed to operation of the known power supply system shown in FIG. 8.

It is first assumed that the switch 3 is closed with the switch 4 being opened. In this case, the output power $P_1$ of the inverter 1 is supplied to the load 6 as a load power $P_\delta$. Starting from this state, it is again assumed that the power supply to the load 6 is to be changed over from the inverter 1 to the AC power source 2.

For realizing the change-over of the power sources mentioned above without interrupting the power supply to the load 6 through the bus 5, the switch 4 is first closed to establish a parallel operation state in which the invertor 1 and the power source 2 are operated in parallel. Thereafter, the switch 3 is opened. In the parallel operation state, a cross current will flow between the inverter 1 and the AC power source 2, which current has a magnitude corresponding to differences between the output voltages and phases of the inverter 1 and the AC power source 2.

In this conjunction, let's assume that the voltage amplitudes of the output powers of the inverter and the AC power source 2 are equal to each other and that impedance of the inverter and the AC power source connected in parallel is provided only by reactance due to an internal reactance of the electric generator constituting the AC power source. On these assumptions, the cross current may be considered to be provided only by the active current component which is ascribable to the difference in phase between the output of the inverter and that of the power source, Consequently, in the parallel operation of the power supply system, the burden for power supply to the load is shared between the inverter and the power source or generator in dependence on the power-versus-frequency characteristics thereof.

In other words, the power supply system operates at such an operation point where the inverter 1 bears the supply of the power $P_1$ with the power source bearing the power $P_2$ at a frequency $f_1$ shown in FIG. 9. Of course, the load power $P_\delta$ supplied to the load 6 is given by $P_\delta = P_1 + P_2$.

As can be understood from the above description, by imparting the frequency-versus-characteristic such as mentioned above to the inverter 1 by providing the inverter control circuit constituted by the circuit elements 10 to 15 shown in FIG. 8, the inverter 1 and the AC power source 2 can share the power supply to the load 6 in accordance with the respective power-frequency characteristics.

However, in the known power supply system described above, no consideration is paid to the transient operation state which prevails immediately after the parallel operation has been validated by closing both the switches 3 and 4. Consequently, there arise various problems during a period in which no synchronism is established between the AC powers $P_1$ and $P_2$ of the two power sources, i.e., the inverter 1 and the AC power source or generator 2.

With the scheme of the known parallel operation control for the power supply system as described above, the power supply to the load 6 can certainly be shared by the inverter or power converter 1 and the power source 2 in the steady operation state. However, in the transient state, immediately after the system has entered the parallel operation, a large cross current will flow until synchronism is established between the two power sources 1 and 2. Accordingly, in-the system where the inverter 1 and the AC power source 2 are to be changed over without interrupting the power supply to the load 6, the inverter 1 and the AC power 2 are operated in parallel only for a short time. However, in case a large cross current flow which exceeds the rated current of the inverter 1 or the AC power 2 occurs during the parallel operation, the AC voltage $V_1$ or $V_2$ of the inverter 1 or the AC power source 2 droops, as a result of which the voltage of the AC bus 5 is lowered during the change-over period or immediately after the lapse of that period, giving rise to a problem that reliability of the power supply system is degraded. Additionally, even in the isolated operation succeeding to the change-over through the parallel operation, the output frequency of the inverter 1 droops in dependence on the effective power P, which in turn means that the output frequency decreases in dependence on the load 6, to another disadvantage.

Furthermore, when the phase of the AC voltage $V_2$ of the AC power source 2 lags that of the AC voltage $V_1$ of the inverter 1 upon entering the parallel operation, the AC power $P_2$ from the AC power source 2 will be transferred toward the AC output terminals of the inverter 1. Consequently, an AC power $P_2$ is regenerated at the DC input terminals of the inverter 1, resulting in that the DC voltage $V_d$ rises up, whereby there arises the possibility of the elements constituting the inverter 1 being damaged, to a further disadvantage.

It should be noted out that because the effective power P is detected by the power sensor 15, as shown in FIG. 8, the structure of the feedback control system becomes complicated, providing another cause for the deterioration of the reliability of the power supply system.

SUMMARY OF THE INVENTION

In the light of the state of the art described above, it is an object of the present invention to solve the problems of the power supply system known heretofore and provide a power supply system of an improved structure which is capable of suppressing the cross current flow and preventing the output frequency from being undesirably lowered, to thereby enhance the reliability of the power supply system by quickly establishing synchronism between the inverter and the AC power source only when the cross current flow takes place in the parallel operation.

Another object of the present invention is to provide a power supply system which can enjoy an enhanced reliability by gradually shifting the output frequency of the inverter to the center frequency without controlling synchronism with the other AC power source after termination of the parallel operation, to thereby prevent abrupt or steep lowering of the output frequency.

Yet another object of the present invention is to provide a power supply system of an enhanced or improved reliability by establishing rapid synchronization between the inverter and the AC power source upon occurrence of power regeneration from the AC power source to the inverter in the parallel operation, to thereby protect the elements constituting the inverter against injury or damage.

A further object of the present invention is to provide a power supply system of an enhanced reliability by simplifying the circuit configuration of a feedback control system for synchronous control of the inverter output.

The present invention is directed to an electric power supply system which comprises a power converter for outputting a first AC power of a first AC voltage and a first AC current, an AC power source for outputting a second AC power of a second AC voltage and a second AC current, a switch means for supplying at least one of the first and second AC powers to a load, and a power converter control circuit for regulating an output frequency of the power converter in accordance with an active component of the first AC power.

In view of the above and other objects which will become apparent as description proceeds, there is provided according to a first aspect of the invention a power supply system in which a current sensor means for detecting the first AC current supplied from the power converter, a comparator for determining that the first AC current exceeds a predetermined value, and a regulation input means for fetching an active component of the first AC power supplied from the power converter in response to an output signal of the comparator are provided in the power converter control circuit, wherein when the first AC current exceeds the predetermined value, an output frequency of the power converter is so regulated as to coincide with an output frequency of the AC power source by taking into account the active component of the first AC power.

With the arrangement of the power supply system described above, synchronism can rapidly be established between the output power of the AC power source and that of the power convertor, and the output frequency of the voltage-controlled oscillator can be so regulated that a cross current flow between the AC power source and the power converter is decreased in the transient parallel operation, while the output frequency is regulated to be constant when the synchronism control is not required.

According to a second aspect of the invention, there is provided a power supply system, wherein the regulation input means for fetching the effective power is imparted with a function for allowing the active component of the first AC power to pass therethrough in a transient parallel operation in which the first AC power and the second AC power are supplied to the load from the power converter and the AC power source, respectively, through the power source change-over switch means, while inhibiting the active component of the first AC power from passing therethrough in an isolated operation in which only the first AC power is supplied to the load through the switch means, and wherein the power converter control circuit controls the output frequency of the power converter in the transient parallel operation while regulating the output frequency of the power converter to a center frequency corresponding to a no-load operation in the isolated operation in succession to termination of the transient parallel operation.

Owing to the arrangement of the power supply system described above, control of synchronism between the output of the AC power source and that of the power converter can quickly be validated in the transient parallel operation, while in the isolated operation, the control of synchronism between the AC power source and the power converter can gradually be released to thereby prevent the output frequency of the power converter from abruptly decreasing.

Further, there is provided according to a third aspect of the present invention a power supply system in which a power sensor means for detecting a first AC power, a comparator for determining that the first AC power is in a regenerative state, and a regulation input means for fetching an active component of the first AC power in response to an output signal of the comparator are provided in the power converter control circuit. An output frequency of the power converter is so controlled as to coincide with an output frequency of the AC power source in accordance with the active component of the first AC power when the first AC power is in the regenerative state.

With the structure described above, synchronism can be rapidly established between the AC power source and the power converter upon occurrence of regeneration from the AC power source to the power converter, whereby the elements constituting the power converter can positively be protected against injury.

A fourth aspect of the present invention is seen in that the power converter control circuit regulates the output frequency of the power converter such that the first AC power is always maintained higher than the second AC power.

By virtue of the above arrangement, the AC power output form the power converter can constantly be set higher than the AC power generated by the AC power source, whereby the stability of the change-over control can be ensured.

According to a fifth aspect of the present invention, there is provided a power supply system including a power converter control circuit having a current sensor means for detecting the first AC current, a comparator for determining that the first AC current exceeds a predetermined value, and a frequency change-over means for changing the output frequency of the power converter in response to an output signal of the comparator and in dependence on the polarity of the active component of the first AC power. The output frequency of the power converter is so regulated as to be at a highest frequency when the first AC current exceeds the predetermined value and when the active component is of negative polarity, while the output frequency of the power converter is so regulated as to be at minimum when the first AC current exceeds the predetermined value and when the active component is of positive polarity. The output frequency of the power converter is so regulated as to assume a center frequency when the first AC current is below the predetermined value.

In the power supply system of the structure described above, the output frequency of the power converter is set to a maximum value or a minimum value in dependence on the polarity of the active component of the first AC power when the first AC current exceeds a predetermined value in the parallel operation.

A sixth aspect of the invention is seen in that the power converter is constituted by an inverter, wherein the power converter control circuit includes a DC current sensor for detecting a DC current value of the inverter, and wherein the output frequency of the power converter is so regulated as to coincide with the output frequency of the AC power source in response to the DC current value.

In the power supply system of the above-mentioned arrangement, the inverter output frequency can be controlled on the basis of the DC current of the power converter or inverter with an extremely simple circuit configuration.

The above and other objects, features and attendant advantages of the present invention will better be understood upon reading the following description of the preferred embodiments taken, only by way of example, in conjunction with the drawings.

DESCRIPTION OF THE PREFERRED EMBODIMENTS

Now, the present invention will be described in detail in conjunction with the preferred or exemplary embodiments by reference to the drawings.

Embodiment 1

Figure 1:
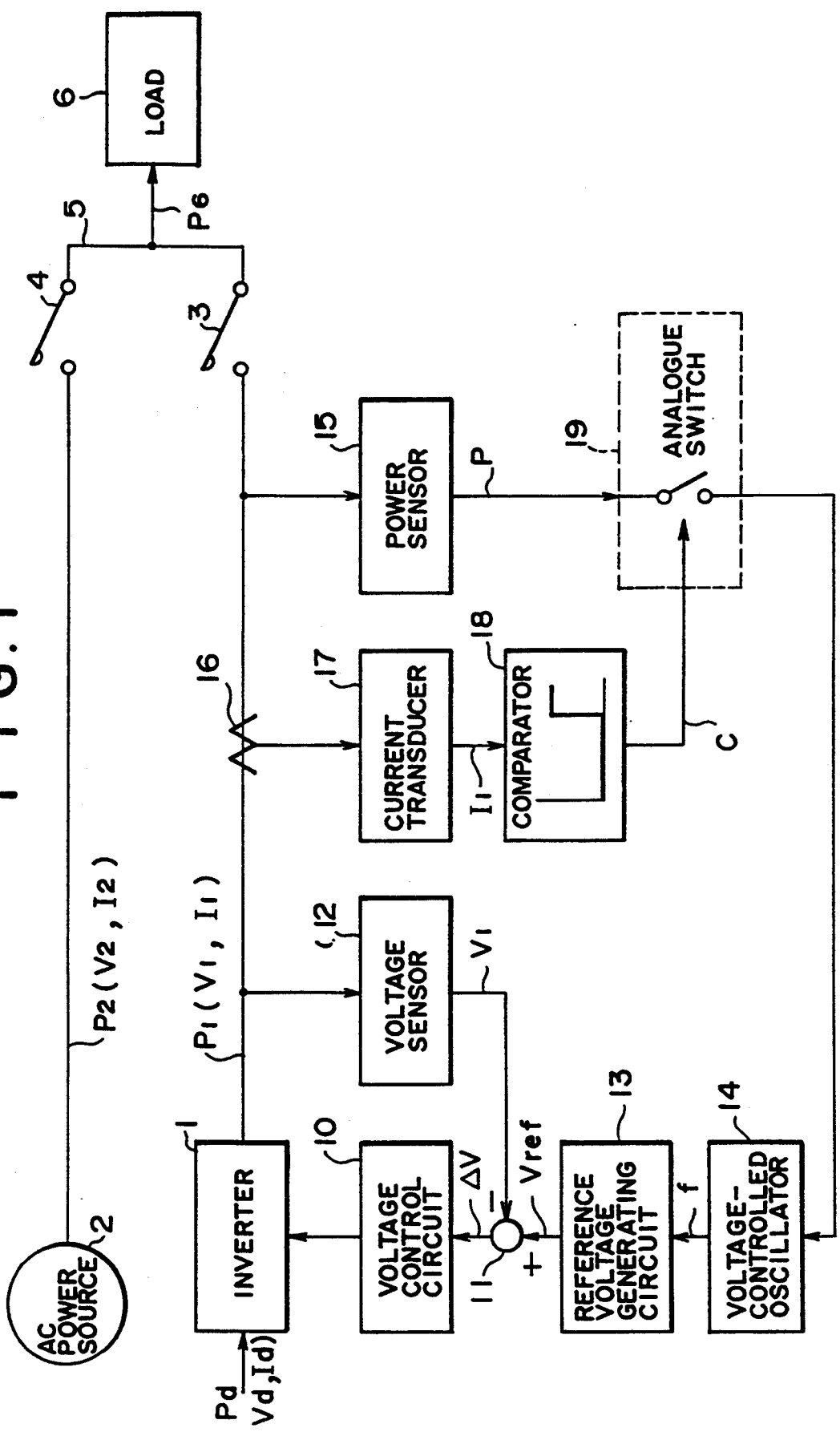
FIG. 1 is a block diagram showing generally a structure or arrangement of a power supply system according to a first embodiment of the present invention.
Figure 8:
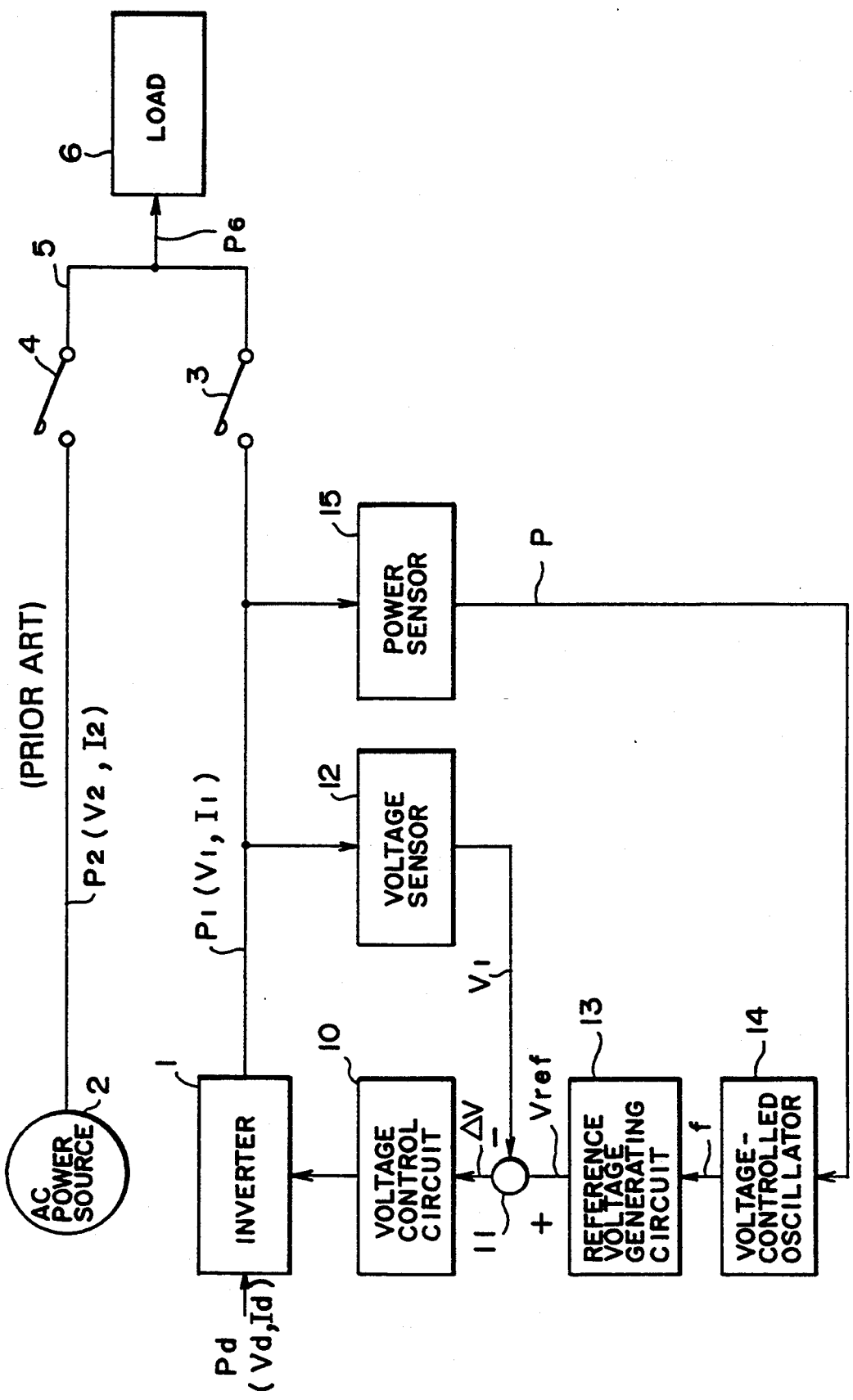
FIG. 8 is a block diagram showing schematically a structure of a hitherto known power supply system.

FIG. 1 shows a power supply system according to a first embodiment of the, present invention. In this figure, the elements or components designated by reference numerals 1 to 6 and 10 to 15 are the same as or equivalent to those denoted by like numerals in FIG. 8 and mentioned hereinbefore. Therefore, repeated description of these elements will be unnecessary.

According to the teachings of the invention realized in this embodiment, the inverter control circuit further includes a current transformer 16 for detecting an AC current $I_1$ output from the inverter 1 and a current sensor or transducer 17 for converting the AC current $I_1$ detected by the current transformer 16 into a voltage signal. The current transformer 16 and the current transducer 17 cooperate to constitute a current sensor means.

A comparator 18 is connected to the output of the current sensor means for determining whether the AC current $I_1$ exceeds a predetermined value. When the AC current $I_1$ exceeds the predetermined value the comparator 18 generates an output signal C of "H" level. An analogue switch 19 is interposed between the output terminal of the power sensor 15 and the voltage-controlled oscillator 14 and is adapted to be closed when the output signal C of the comparator 18 is at the level of "H". Thus, the analogue switch 19 constitutes a regulation input means for fetching an active component P of the AC power $P_1$ in response to the output signal C of the comparator 18.

The predetermined value used as the reference for the decision to be made by the comparator 18 is set in consideration of the AC current $I_1$ flowing in the parallel operation state of the inverter i and the AC power source 2. When the AC current $I_1$ exceeds the predetermined value, i.e., in the parallel operation of the inverter 1 and the power source 2, the analogue switch 19 is closed, whereby the active component or effective power P of the AC power $P_1$ is fetched to be supplied to the voltage-controlled oscillator 14.

By virtue of the arrangement described above, in the parallel operation, the output frequency of the inverter 1 is so regulated as to coincide with the output frequency of the AC power source 2 in dependence on the effective power P through the inverter control circuit constituted by the elements 10 to 19.

On the other hand, in the isolated operation of the inverter 1 after termination of the parallel operation, the output signal C of the comparator 18 assumes a level "L" because the AC current $I_1$ becomes smaller than the predetermined value. Then, the analogue switch 19 is opened, whereby the fetching of the effective power P is interrupted.

Thus, in the isolated operation, the oscillation frequency f of the voltage-controlled oscillator 14 is shifted to the center frequency $f_0$, resulting in that the output frequency of the inverter 1 is regulated to the center frequency $f_0$.

Figure 9:
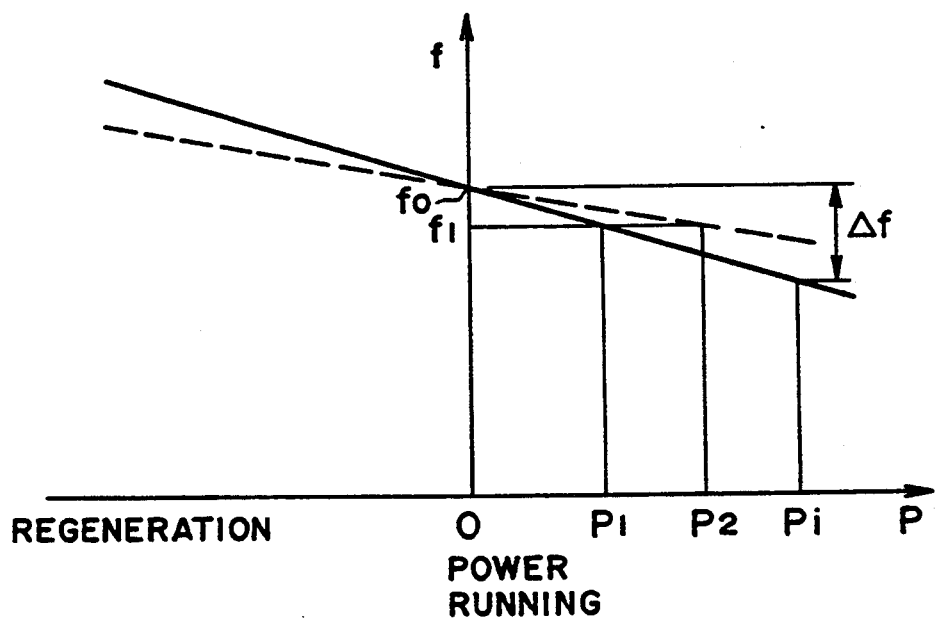
FIG. 9 is a view for graphically illustrating power-versus-frequency characteristics of a voltage-controlled oscillator employed in a conventional power supply system.
Figure 10:
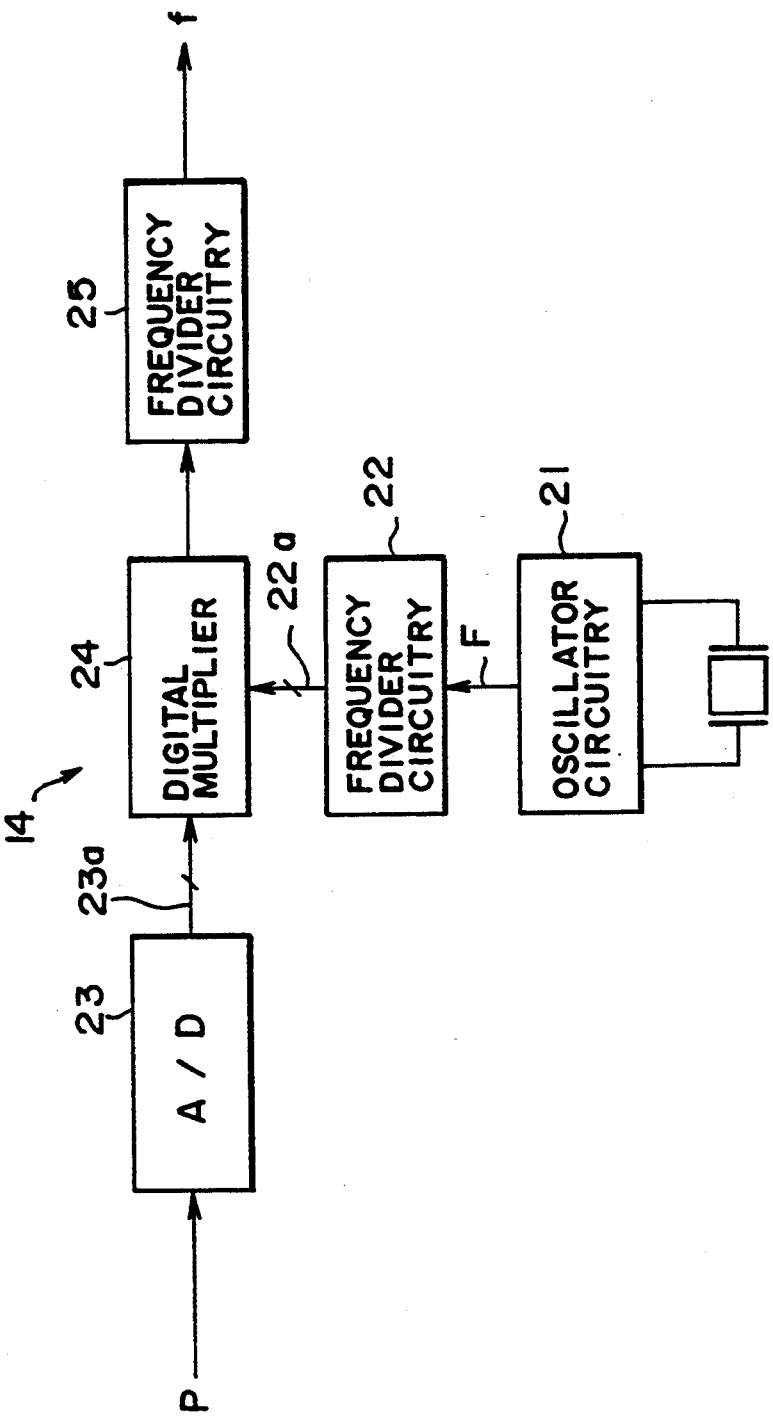
FIG. 10 is a block diagram showing a circuit configuration of a conventional voltage-controlled oscillator.

At this juncture, it should be recalled that in the case of the power supply system known heretofore, the output frequency of the inverter 1 droops in dependence on the effective power P, as can be seen from the characteristic curve shown in FIG. 9, which in turn means that the output frequency f of the inverter 1 droops in dependence on the load 6 even in the isolated operation of the inverter. In contrast, in the case of the power supply system according to the instant embodiment of the invention, synchronous control is performed on the basis of regulation of the output frequency of the inverter 1 only in the parallel operation, while in the isolated operation, the inverter is controlled to output the center frequency $f_0$, whereby the output frequency f is prevented from lowering.

As will be appreciated from the above description, by setting the predetermined value for reference for the decision performed by the comparator 18 at a higher value than the value of the current supplied ordinarily to the load 6, the frequency control, i.e., the synchronism control of the inverter 1 based on the effective power P is performed only when the AC current $I_1$ output from the inverter 1 increases due to the cross current from the AC power source 2 in the parallel operation. On the other hand, in the isolated operation of the inverter 1, the output frequency f assumes the center frequency $f_0$ in correspondence to the effective power of zero.

Embodiment 2

In the case of the power supply system according to the first embodiment of the invention, the analogue switch 19 is opened instantaneously when the AC current $I_1$ decreases below the predetermined value set for the comparator 18 after termination of the parallel operation, which is accompanied with a rapid shift of the output frequency f of the inverter 1 to the center frequency $f_0$. In practical application, however, it is desirable to shift the output frequency f to the center frequency $f_0$ smoothly.

With the second embodiment of the invention, it is contemplated to perform the synchronism control only in the parallel operation for changing over the power sources and shift gently or smoothly the output frequency of the inverter 1 to the center frequency $f_0$ after termination of the parallel operation.

Figure 2:
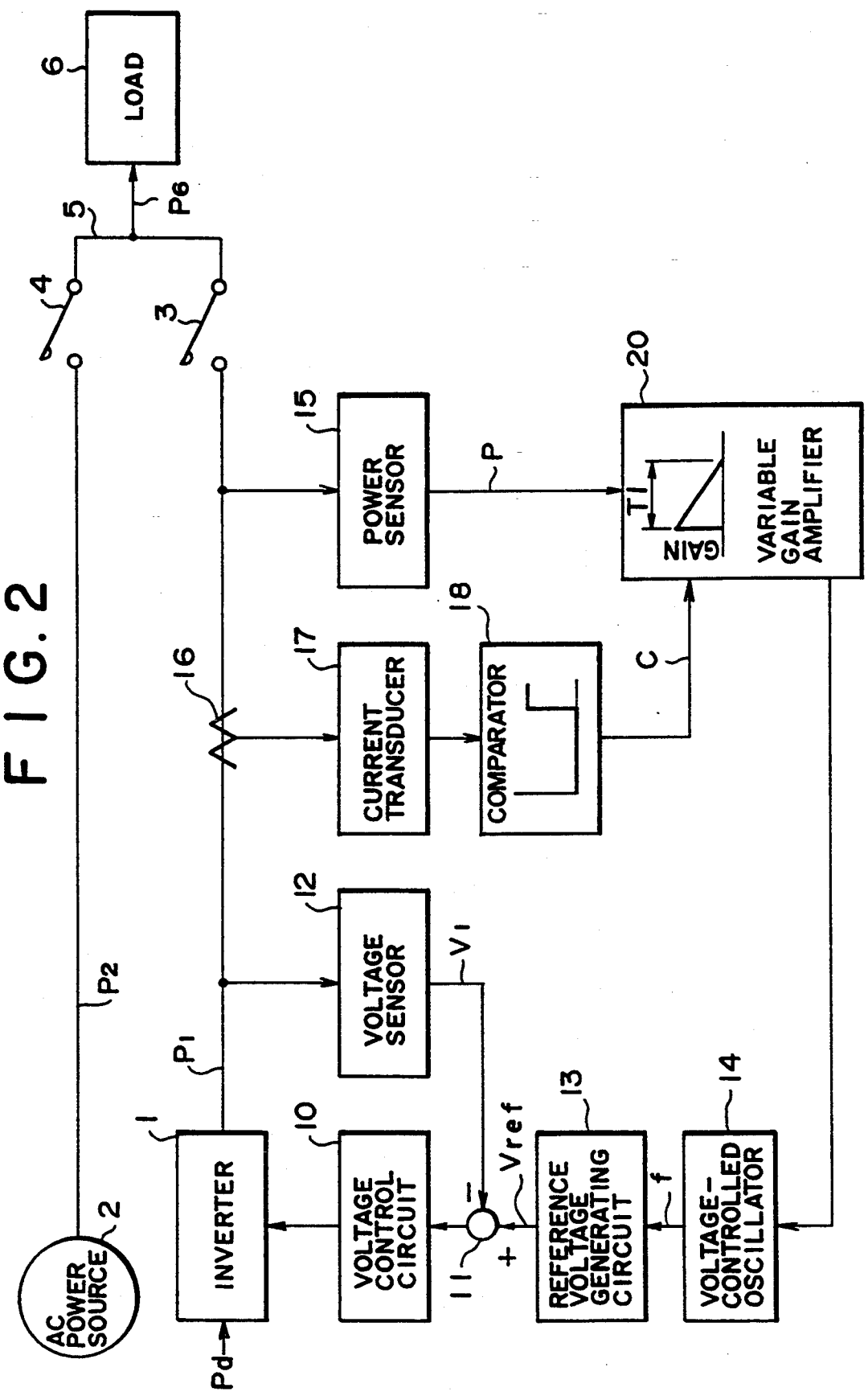
FIG. 2 is a block diagram showing schematically a structure of the power supply system according to a second embodiment of the invention.

FIG. 2 shows a structure of the power supply system according to the second embodiment of the invention. Referring to the figure, a variable gain amplifier 20 is interposed between the power sensor 15 and the voltage-controlled oscillator 14 as the regulation input means. This variable gain amplifier 20 is so designed that gain thereof becomes "1" (unity) when the output signal C of the comparator 18 assumes the level "H" and that the gain is gradually lowered to "0" (zero) over a time span T1 when the output signal C of the comparator 18 assumes the level "L".

It should be noted that the abovementioned time span or period T1 for the variable gain amplifier 20 is set sufficiently longer than the duration of the parallel operation for the change-over of the power sources in which both the switches 3 and 4 are closed. More specifically, in the transient parallel operation in which both the switches 3 and 4 are closed to supply the AC powers $P_1$ and $P_2$ to the load 6, the effective or active component P of the AC power $P_1$ is allowed to pass through the variable gain amplifier 20 with the gain of "1". On the other hand, when the switch 4 is opened with the switch 3 being held in the closed state to supply only the AC power $P_1$ to the load 6 after lapse of the transient parallel operation (i.e., after lapse of T1 seconds), the effective power P passing through the variable gain amplifier 20 is gradually decreased.

More specifically, when the cross current which exceeds a predetermined value flows to the AC input side of the inverter 1 in the parallel operation of the inverter 1 and the AC power source 2, the gain of the variable gain amplifier 20 is set to "1" in response to the output signal C of the comparator 18, whereby synchronous control is started, as described previously, and the difference in phase between the output of the inverter 1 and that of the AC power source 2 is decreased. However, when the cross current decreases below the predetermined value, the gain of the variable gain amplifier 20 decreases only gradually to zero over the time span of T1 seconds.

As a result of this, the input to the voltage-controlled oscillator 14 decreases gradually to zero, causing the output frequency f of the inverter 1 to be smoothly shifted back to the center frequency $f_0$. Thus, in the isolated operation, the inverter 1 can operate at the center frequency $f_0$ which corresponds to the frequency in the no-load operation state.

Embodiment 3

In the power supply systems according to the first and second embodiments of the invention, there may arise such situation that the comparator 18 remains inoperative because of a small cross current, thus prohibiting output frequency control of the inverter 1 when the difference in phase between the AC powers $P_1$ and $P_2$ is small upon initiation of the transient parallel operation of the inverter 1 and the AC power source 2.

It is, however, noted that when the phase of the inverter output is delayed more or less relative to that of the AC power source 2, resulting in occurrence of power regeneration from the AC power source 2 to the inverter 1, there may arise such situation that the DC voltage of the inverter 1 is boosted due to reverse converting operation thereof. In the case where such regenerative state is brought about even insignificantly, synchronous control should preferably be performed.

With the teaching of the invention realized in the third embodiment thereof, it is contemplated to perform synchronous control when a power is regenerated from the AC power source 2 to the inverter 1.

Figure 3:
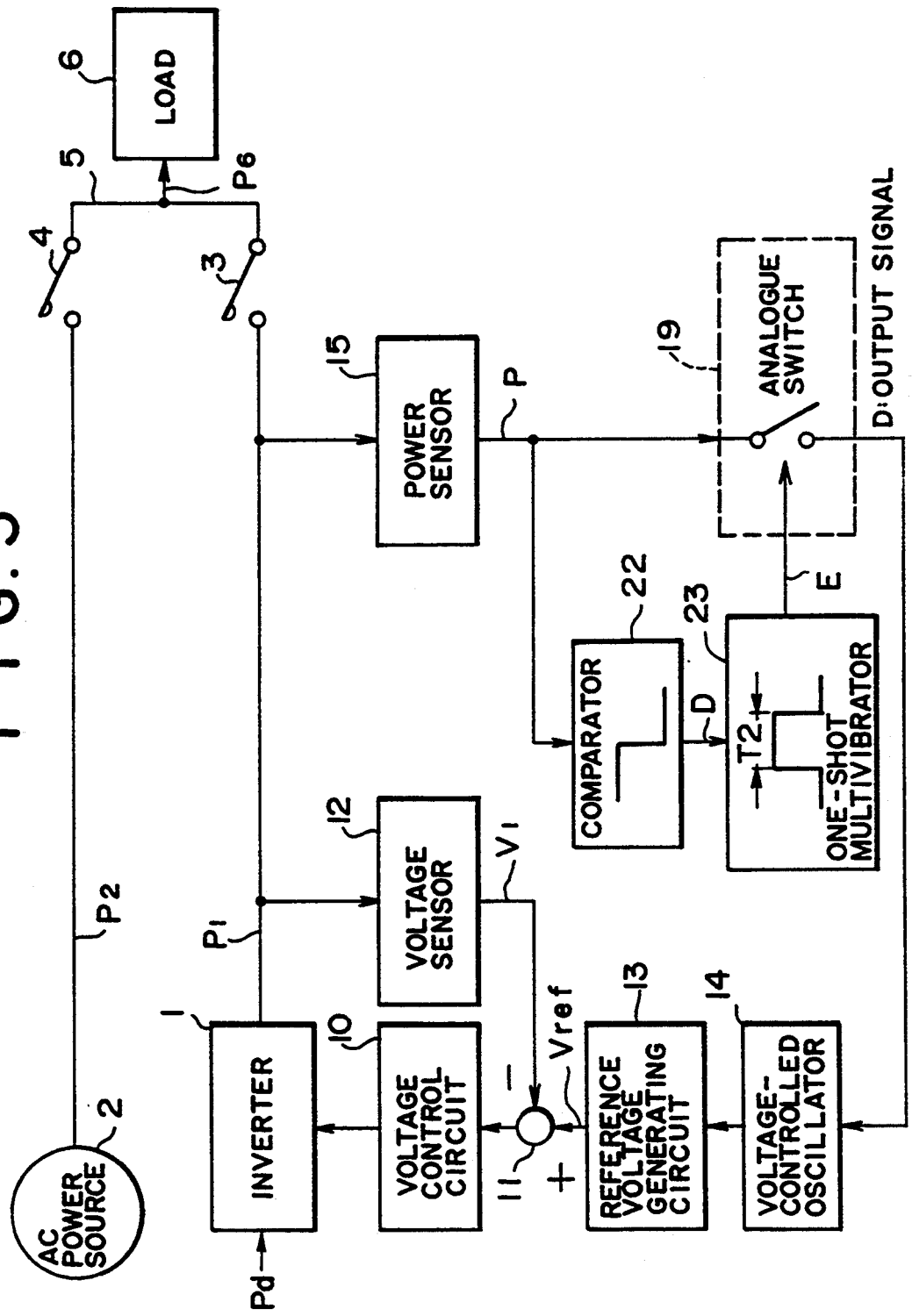
FIG. 3 is a block diagram showing schematically a structure of the power supply system according to a third embodiment of the invention.

FIG. 3 shows a structure of the power supply system according to the third embodiment of the invention. As can be seen from FIG. 3, the inverter control circuit includes a comparator 22 connected to the output terminal of the power sensor 15. This comparator 22 is designed to make decision on the basis of the effective power P detected by the power sensor whether or not the AC power $P_1$ is in the regenerated state and generates an output signal D of "H" level when the effective power P is of negative polarity.

A one-shot multivibrator 23 is connected to an output terminal of the comparator 22 and designed to output a pulse E of a duration T2 (in seconds) when the output signal D of the comparator 22 assumes a level of "H". The duration T2 is selected to be sufficiently longer than that of the parallel operation in which both the switches 3 and 4 are simultaneously closed.

An analogue switch 19 connected to the output terminal of the one-shot multivibrator 23 and closed when the latter produces a pulse E constitutes the regulation input means for fetching the effective power P in response to the output signal D of the comparator 22.

When the comparator 22 decides on the basis of the detected effective power P of negative polarity that the AC power $P_1$ is in the regenerative state, the output signal D of the comparator 22 assumes the level "H", as a result of which the one-shot multivibrator 23 outputs the pulse E of "H" level for the period of T2 seconds. Consequently, the analogue switch 19 is closed to allow the effective power P to flow therethrough to be applied to the voltage-controlled oscillator 14. In this manner, the inverter control circuit controls the output frequency of the inverter 1 so as to coincide with the output frequency of the AC power source 2 on the basis of the effective power P.

As will be understood from the above description, when the effective power P becomes negative because of the power regeneration from the AC power source 2 to the inverter 1 due to the phase lag of the output power of the inverter 1 upon entering the parallel operation, the inverter control circuit performs synchronous control only for the period of T2 seconds, whereby synchronism can be rapidly established between the inverter 1 and the AC power source 2.

Since the period T2 is sufficiently longer than the duration of the parallel operation, synchronous control is effective during the parallel operation of the inverter 1 and the AC power source 2, while the output frequency of the inverter 1 and, hence that of the power supply system is regulated to be the center frequency $f_0$ in the isolated operation of the inverter 1. At this juncture, it should be mentioned that the regeneration decision circuit comprising comparator 22 and one-shot multivibrator 23 can be employed in combination with the current sensor means described hereinbefore in the first and second embodiments.

Embodiment 4

In the case of the first to third embodiments, the voltage-controlled oscillator 14 having the characteristic illustrated in FIG. 9 is employed for effecting synchronous control which satisfies the condition that $P_1 < P_2$ when the effective power P is of positive polarity. However, synchronous control may alternatively be performed such that the condition $P_1 > P_2$ can be satisfied. In this case, an advantage of an improved control stability can be obtained.

With the fourth embodiment of the present invention, it is contemplated to provide the power supply system in which the effective power $P_1$ output from the inverter 1 is primarily in charge of bearing the power supply $P_{67}$ to the load 6.

Figure 4:
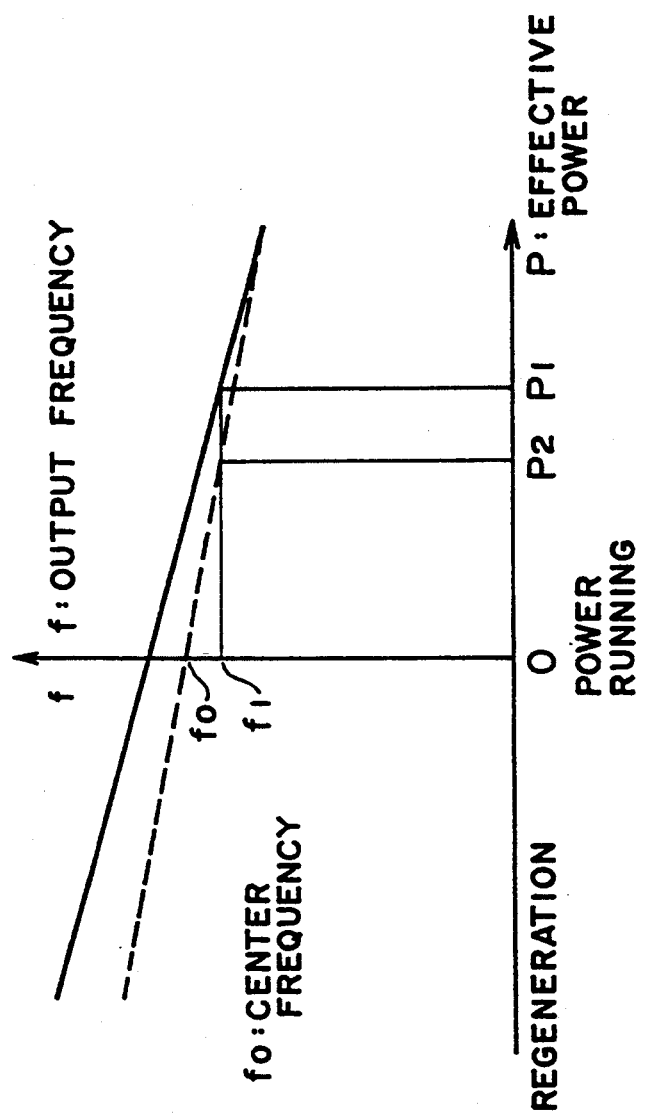
FIG. 4 is a view for illustrating graphically power-versus-frequency (P-f) characteristics realized by a voltage-controlled oscillator incorporated in the power supply system according to a fourth embodiment of the invention.

FIG. 4 shows power-versus-frequency characteristics of the voltage-controlled oscillator 14. More specifically, a solid line curve represents the output frequency characteristic of the inverter 1, and a broken line curve represents the output frequency characteristic of the AC power source 2.

As can be seen from FIG. 4, the output frequency (represented by the solid line curve) of the inverter 1 is higher than the center frequency $f_0$, than the output frequency (broken curve) of the AC power source 2 in the no-load state, i.e., when the effective power P is zero. When the effective power P is of positive polarity, the frequency droops, while it rises up when the effective power P is of negative polarity.

In this case, the inverter 1 and the AC power source or generator 2 operate at an operation point where they share the load power $P_8$ by $P_1$ and $P_2$, respectively, at the frequency $f_1$ (>0) in the parallel operation. Of course, the load power $P_{67}$ is given as a sum of $P_1$ and $P_2$, where $P_1 > P_2$.

In this way, in the parallel operation for regulating or adjusting the output frequency, the inverter control circuit performs such control that the AC power $P_1$ to be borne by the inverter 1 is constantly higher than the AC power $P_2$, whereby the power supplied to the load 6 transits stepwise smoothly or uniformly throughout the power supply change-over operation process, i.e., before, during and after the power supply change-over.

Upon termination of the parallel operation, the analogue switch 19 is opened, resulting in the disabling of synchronous control.

Embodiment 5

In the case of the first to third embodiments, the voltage-controlled oscillator 14 exhibiting the power-versus-frequency characteristics illustrated in FIG. 9 is employed for realizing synchronous control between the AC powers $P_1$ and $P_2$ by controlling the inverter output frequency f. It is however desirable to effectuate a forcive synchronous control as soon as possible when the parallel operation is started.

With the fifth embodiment of the invention, it is contemplated to effectuate the forcive inverter synchronous control immediately upon starting of the parallel operation.

Figure 5:
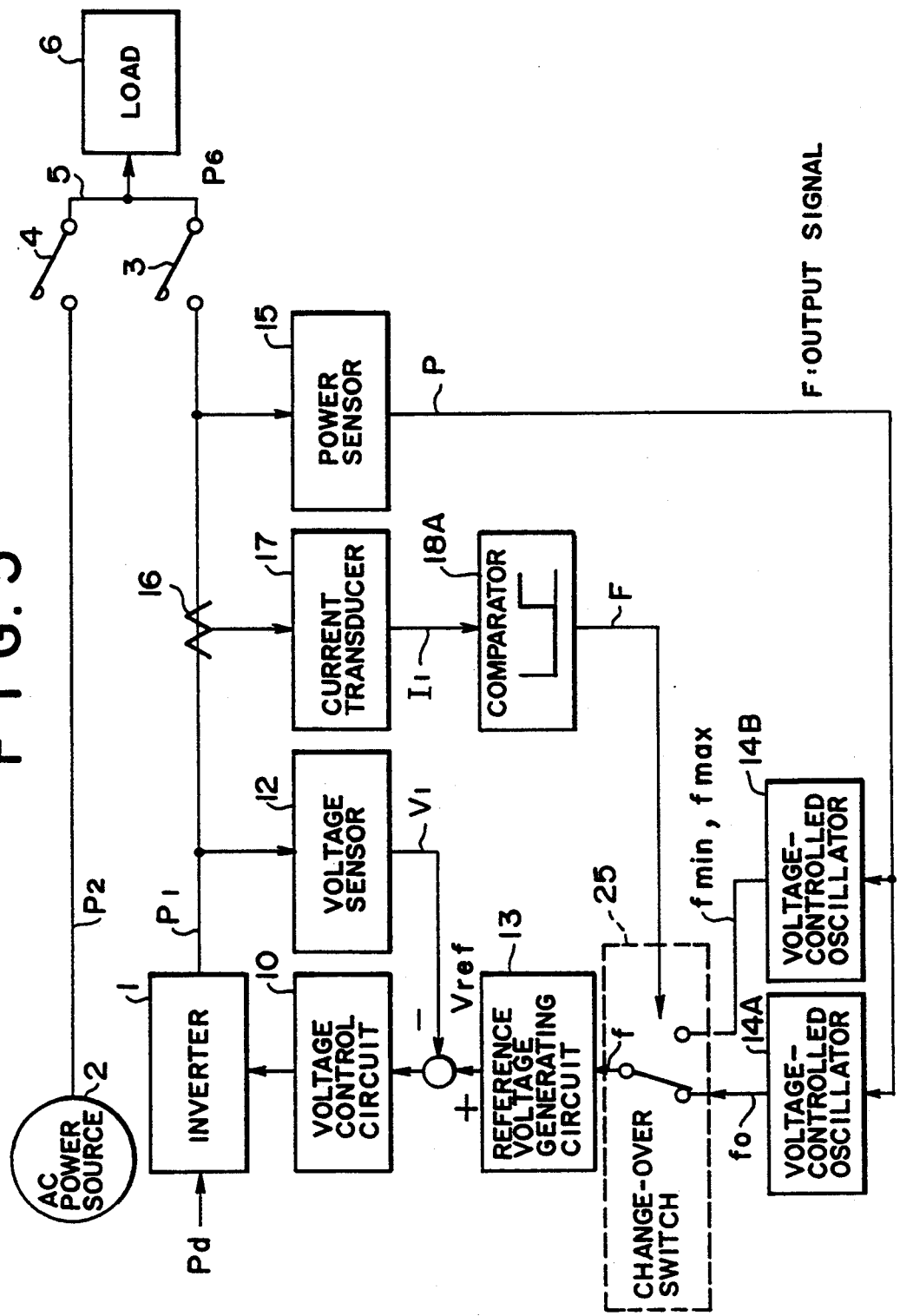
FIG. 5 is a block diagram showing schematically a structure of the power supply system according to a fifth embodiment of the invention.

FIG. 5 shows a power supply system according to the fifth embodiment of the invention. As can be seen in the figure, there are provided a voltage-controlled oscillator 14A for generating the center frequency $f_0$, a voltage-controlled oscillator 14B for generating a lowest (minimum) frequency $f_{min}$ or a highest (maximum) frequency $f_{max}$ in dependence on the polarity of the effective power P, and a change-over switch 25 inserted between the voltage-controlled oscillators 14A and 14B and a reference voltage generating circuit 13. A comparator 18A serves for making decision as to whether the AC current $I_1$ exceeds a predetermined value and generates an output signal F of "H" level when the answer of the decision is affirmative. The output signal F is input to the change-over switch 25 which has an output terminal connected to an input terminal of the reference voltage signal generator 13. When the output signal F of the comparator 18A is at "L" level, the change-over switch 25 allows the center frequency $f_0$ from the voltage-controlled oscillator 14A to pass therethrough while allowing the lowest frequency $f_{min}$ or the highest frequency $f_{max}$ from the voltage-controlled oscillator 14B to pass therethrough when the output signal F is at the level of "H".

Thus, the voltage-controlled oscillators 14A and 14B cooperate to constitute a frequency change-over means for changing over selectively the output frequencies of the inverter 1 in response to the output signal F of the comparator 18A and in dependence on the polarity of the effective power P.

Figure 6:
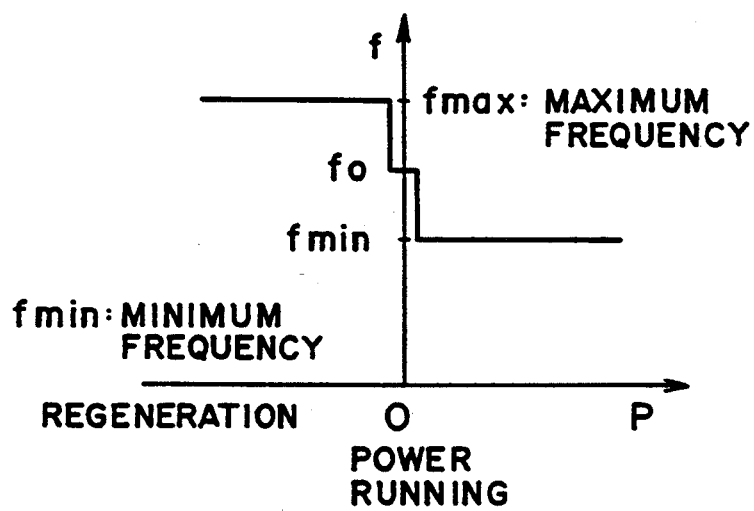
FIG. 6 is a view for illustrating graphically power-versus-frequency characteristics realized by a frequency change-over means in the power supply system according to the fifth embodiment of the invention.

FIG. 6 is a view for illustrating graphically the power-versus-frequency relationship imparted to the frequency change-over means 14A, 14B and 25. As can be seen in this figure, when the effective power P is of positive polarity (indicative of the power running), a minimum or lowest frequency $f_{min}$ is generated, while in case the effective power P is of negative polarity (indicating the state of regeneration), a predetermined highest or maximum frequency $f_{max}$ is generated. Further, when the effective power P is zero (indicating the no-load state), the center frequency $f_0$ is generated.

In the power supply system according to the fifth embodiment of the invention, the change-over switch 25 selects the voltage-controlled oscillator 14B in response to the output signal F of the level "H" when the AC current $I_1$ exceeds the predetermined value and when the effective power P is of negative polarity. When the effective power P is of negative polarity, the voltage-controlled oscillator 14B generates the maximum frequency $f_{max}$ in response to the effective power P of negative polarity. In this manner, the inverter control circuit regulates the output frequency f of the inverter 1 to the maximum frequency $f_{max}$.

When the AC current $I_1$ exceeds the predetermined value and when the effective power P is of positive polarity, the change-over switch 25 responds to the output signal F of "H" level to select the voltage-controlled oscillator 14B, whereby the minimum or lowest frequency $F_{min}$ is generated by the voltage-controlled oscillator 14B in response to the effective power P of positive polarity. Thus, the inverter control circuit regulates the output frequency f of the inverter 1 to the lowest or minimum frequency $F_{min}$.

When the AC current $I_1$ is within the predetermined range (i.e., substantially equal to zero), the change-over switch 25 selects the voltage-controlled oscillator 14A in response to the output signal F of "L" level. Consequently, the inverter control circuit regulates the output frequency f of the inverter 1 to the center frequency $f_0$.

In general, the speed at which the phase of the AC power $P_1$ output from the inverter 1 is equalized to that of the AC power $P_2$ supplied from the AC power source 2 increases as the difference in frequency between both the output powers increases. Accordingly, when the cross current of a magnitude greater than the predetermined value flows at the start of the parallel operation, synchronism can be speedily established by setting the output frequency f to the predetermined lowest frequency $f_{min}$ or highest frequency $f_{max}$ in dependence on the polarity of the effective power P.

Parenthetically, although it has been mentioned that the power converter is constituted by the inverter 1 for converting a DC power to an AC power, a cyclo-converter for DC-to-AC power transformation may be employed to substantially same effect.

Embodiment 6

In the case of the first to fifth embodiments, the effective power P detected by the power sensor 15 is fed back to the voltage-controlled oscillator 14, as in the case of the power supply system known heretofore. However, when the power converter is constituted by the inverter 1 in the intrinsic sense of the term, a current value at the DC side of the inverter 1 may be employed as the feedback quantity.

With the sixth embodiment of the invention, it is contemplated to detect a DC current $I_d$ of the inverter 1 in place of the effective power P.

Figure 7:
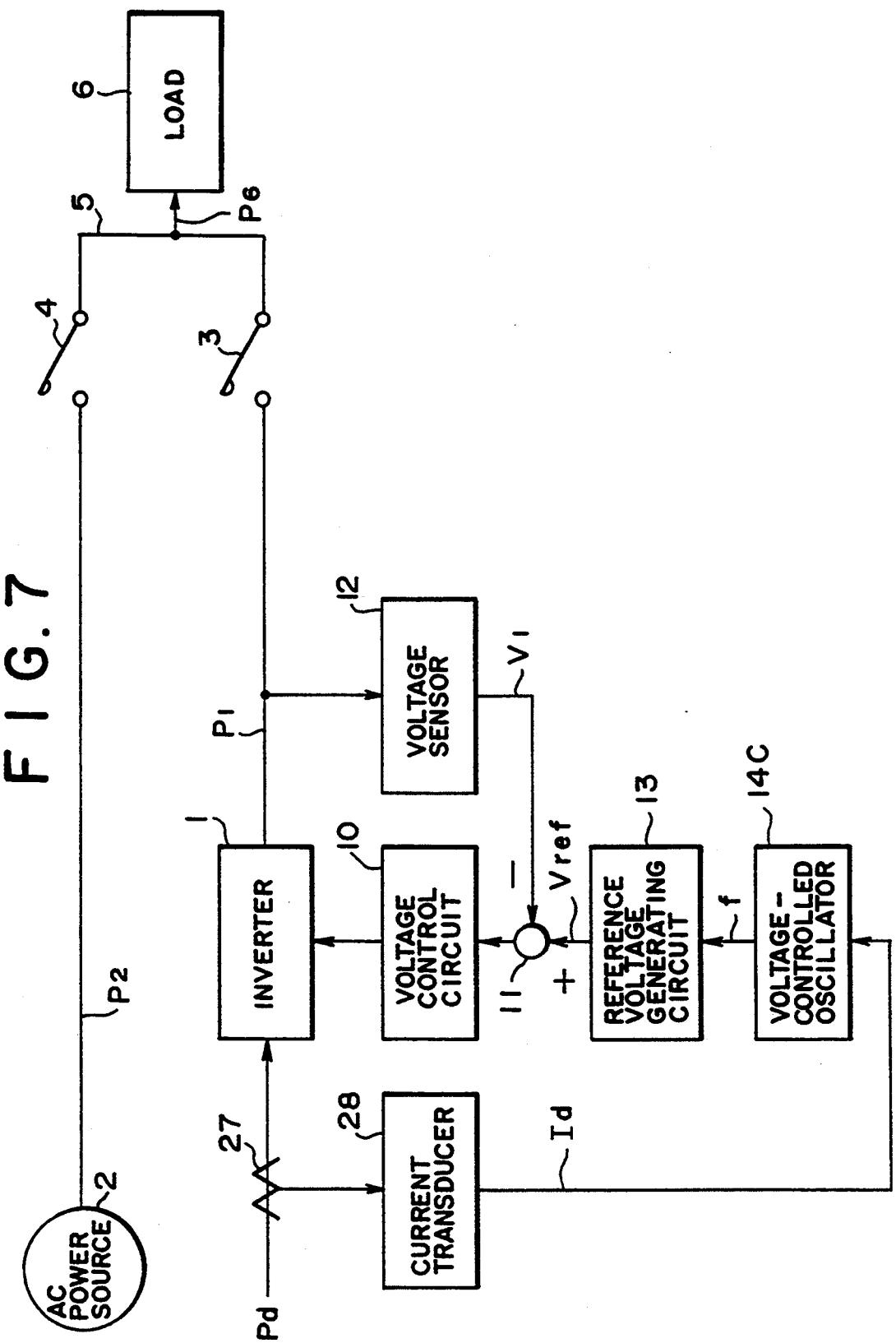
FIG. 7 is a block diagram showing schematically a structure of the power supply system according to a sixth embodiment of the invention.

FIG. 7 shows schematically a structure of the power supply system according to the sixth embodiment of the invention. Referring to this figure, a current transformer 27 is provided for detecting a DC current $I_d$ at the input side of the inverter 1 in combination with a current transducer 28 for converting the DC current $I_d$ as detected to a voltage signal. The current transformer 27 and the DC current transducer 28 cooperate to constitute a DC current sensor means for detecting a DC current value of the inverter 1, wherein the DC current signal $I_d$ output from the current transducer 28 is input to the voltage-controlled oscillator 14C to be utilized for controlling the output frequency of the inverter 1.

In the case of the instant embodiment, the inverter control circuit comprised of the DC current sensor means 27 and 28 is adapted to regulate the output frequency of the inverter 1 so as to coincide with the output frequency of the AC power source 2 in response to the DC current $I_d$.

In general, only the active component flows at the DC side of the inverter 1. Consequently, when the DC voltage $V_d$ becomes substantially constant, the DC current $I_d$ at the input side of the inverter 1 is at least approximately in proportion to the active current. For this reason, there can be realized substantially the same effect as in the case of the first to fifth embodiments by detecting the input DC current $I_d$ of the inverter 1 instead of the output current $I_1$.

By way of example, when the effective power P is to be detected from the AC power $P_1$ as in the case of the first to fifth embodiments, it is required to detect the phase relation between the AC voltage $V_1$ and the AC current $I_1$, which means that the sensor means to this end will have to be implemented in a complicated configuration. In contrast, according to the sixth embodiment of the invention, the DC current $I_d$ can easily be detected by the current sensor means 27 and 28 with a much simplified structure.

In conjunction with the sixth embodiment, it should further be mentioned that an analogue switch may be interposed between the current transducer 28 and the voltage-controlled oscillator 14. The DC current $I_d$ output from the current transducer 28, is caused to pass through a comparator to thereby close the analogue switch in dependence on the comparator output when the DC current $I_d$ indicates the regeneration state (negative polarity) or the cross current state (positive polarity).

Many features and advantages of the present invention are apparent form the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

I claim:

1. An electric power supply system, comprising:
  a power converter for outputting a first AC power signal of a first AC voltage and a first AC current;
  an AC power source for outputting a second AC power signal of a second AC voltage and a second AC current said AC power source having an output connected to an output from said power converter;
  switch means for supplying at least one of the first and second AC power signals to a load; and
  a power converter control circuit for regulating an output frequency of said power converter in accordance with an active component of the first AC power signal;
  said power converter control circuit including:
  current sensor for detecting the first AC current;
  comparator connected to said current sensor for generating an output signal indicative of whether said first AC current exceeds a predetermined value; and
  regulation input means connected to said comparator for fetching an active component of said first AC power signal responsive to the output signal of said comparator means;
  wherein when said first AC current exceeds the predetermined value, an output frequency of said power converter is so regulated as to coincide with an output frequency of said AC power source responsive to the active component of the first AC power signal.

2. An electric power supply system according to claim 1, wherein said power converter control circuit regulates the output frequency of said power signal converter such that said first AC power is constantly maintained higher than said second AC power signal.

3. An electric power supply system according to claim 1, wherein said regulation input means includes an analogue switch having inputs connected to the output of said comparator means, and further comprising a power sensor connected to an output of said power converter and to an input of said comparator means for detecting the active component of the first AC power signal, and having a voltage-controlled oscillator including an input connected to an output of said analogue switch, wherein when it is decided by said comparator means that said first AC current exceeds the predetermined value, said analogue switch is closed to thereby apply the active component of the first AC power signal output from said power sensor to said voltage-controlled oscillator, said voltage-controlled oscillator having an output frequency which is utilized for regulating an output frequency of said power converter so that the output frequency of the power converter coincides with the output frequency of said AC power source.

4. An electric power supply system according to claim 1, wherein said regulation input means allows the active component of the first AC power signal to pass therethrough in a transient parallel operation for supplying said first and second AC power signals to said load through said switch means while inhibiting the active component of said first AC power signal from passing therethrough in an isolated operation for supplying only said first AC power signal to said load; and wherein said power converter control circuit regulates the output frequency of said power converter in said transient parallel operation by regulating the output frequency of said power converter to a center frequency corresponding to a no-load state in the isolated operation in succession to termination of said transient parallel operation.

5. An electric power supply system according to claim 4, wherein said regulation input means includes a variable gain amplifier having a gain dependent upon the output of said comparator means.

6. An electric power supply system according to claim 4, wherein said power converter control circuit regulates the output frequency of said power converter such that the first AC power signal is constantly maintained higher than the second AC power signal.

7. A power supply system, comprising:
a power converter for outputting a first AC power signal of a first AC voltage and a first AC current;
an AC power source for outputting a second AC power of a second AC voltage and a second AC current;
switch means for supplying at least one of said first and second AC power signals to a load; and
a power converter control circuit for regulating an output frequency of said power converter in accordance with an active component of said first AC power signal, said power converter control circuit including:
a power sensor for detecting said first AC power signal and generating an output signal;
comparator means connected to said power sensor for making decision on the basis of the output signal of said power sensor means as to whether said first AC power signal is in a regenerative state and for generating an output signal;
a multivibrator connected to said comparator means and
regulation input means connected to said power sensor and said multivibrator for fetching an active component of said first AC power signal in response to the output signal of said multivibrator;
wherein an output frequency of said power converter is so regulated as to coincide with an output frequency of said AC power source responsive to the active component of the first AC power signal, when said first AC power signal is in the regenerative state.

8. An electric power supply system according to claim 7, wherein said regulation input means includes an analogue switch having an input connected to an output of said power sensor, and the multivibrator includes a one-shot multivibrator and further comprising a voltage-controlled oscillator connected to an output of said analogue switch, wherein when the output signal of said comparator means indicates that said power converter is in the regenerative state, the one-shot multivibrator outputs a signal of a predetermined duration to said analogue switch so that the output of said power sensor is supplied to the voltage-controlled oscillator.

9. An electric power supply system according to claim 7, wherein said power converter control circuit regulates the output frequency of said power converter such that said first AC power signal is constantly maintained higher than said second AC power.

10. An electric power supply system, comprising:
a power converter for outputting a first AC power signal of a first AC voltage and a first AC current;
an AC power source for outputting a second AC power signal of a second AC voltage and a second AC current;
switch means for supplying at least one of said first and second AC power signals to a load; and
a power converter control circuit for regulating an output frequency of said power converter;
wherein said power converter control circuit includes:
current sensor means for detecting the first AC current, the current sensor means having an input being connected to the power converter;
comparator means for making decision as to whether the first AC current exceeds a predetermined value, the comparator means being connected to an output of the current sensor means; and
frequency change-over means for changing the output frequency of said power converter in response to an output signal of said comparator means and dependent on the polarity of the active component of said first AC power signal;
wherein the output frequency of said power converter is so regulated as to be maximum when the first AC current exceeds the predetermined value and when the active component is of negative polarity;
while said output frequency of said power converter is so regulated as to be minimum when the active component is of positive polarity; and
said output frequency of said power converter is so regulated as to become a center frequency when said first AC current is below the predetermined value.

11. An electric power supply system, comprising:
an inverter having a DC current input and outputting a first AC power signal of a first AC voltage and a first AC current;
an AC power source for outputting a second AC power signal of a second AC voltage and a second AC current;
switch means for supplying at least one of said first and second power signals to a load;
a power converter control circuit for regulating an output frequency of said inverter, said control circuit comprising a transformer connected to an input side of said inverter for detecting a DC current inputted to said inverter and a DC current transducer connected to an output of said transformer for converting the DC current output of said transformer to a corresponding voltage signal; and
a voltage controlled oscillator connected to an output of said DC current transducer for controlling an output frequency of said inverter in such a manner that the output frequency of said inverter is so regulated as to coincide with the output frequency of said AC power source responsive to said DC current output of said transformer;

wherein an active component of said second AC power signal is substantially detected by the output of said DC current transducer.

* * * * *

UNITED STATES PATENT AND TRADEMARK OFFICE
CERTIFICATE OF CORRECTION

PATENT NO. : 5,422,518
DATED : June 6, 1995
INVENTOR(S) : Nobuo Sashida

It is certified that error appears in the above-indentified patent and that said Letters Patent is hereby corrected as shown below:

Column 16, Line 11, after "power" insert --signal--.

Signed and Sealed this

Twenty-ninth Day of August, 1995

Attest:

BRUCE LEHMAN

Attesting Officer     Commissioner of Patents and Trademarks